Nov. 30, 1948.　　　　B. E. WATT　　　　2,455,345
CAPACITIVE ANGULAR VELOCITY MEASURING DEVICE
Filed May 21, 1946

Inventor
BOB E. WATT
By F. J. Schmitt
Attorney

Patented Nov. 30, 1948

2,455,345

UNITED STATES PATENT OFFICE 2,455,345

CAPACITIVE ANGULAR VELOCITY MEASURING DEVICE

Bob E. Watt, Boston, Mass., assignor to the United States of America as represented by the Secretary of the Navy Application May 21, 1946, Serial No. 671,181

3 Claims. (Cl. 175—183)

This invention relates to measuring devices operating from intelligence received from a capacitor plate in close proximity to a revolving mass, the speed of which is to be measured.

A primary object of this invention is to provide means for measuring the speed of rotation of rotating members, particularly non-circular members, to which mechanical connections for this purpose are very difficult or impossible.

A further object of this invention is to provide means for indicating the described measurement at a remote point from the site of the rotating member.

Other objects and advantages of this invention will be apparent from the following description and drawings in which.

The rotational speed of a non-circular object can be measured without direct mechanical connections thereto by placing near its surface a capacitor plate. From knowledge of the object's surface contours, the variations in capacitance may be detected in any of a number of ways depending on the circumstances under which it is used, thereby providing a direct means for measuring speed of rotation. By including the changing capacitance as part of the resonant circuit of an oscillator, a radio-frequency carrier can be modulated. By including the changing capacitance as part of a modulation circuit, a radio-frequency carrier can thus be amplitude modulated. Transmission by line or radiation can then carry the modulated carrier to suitable detecting circuits for counting the number of cycles made by the capacitor plate.

Figure 1:
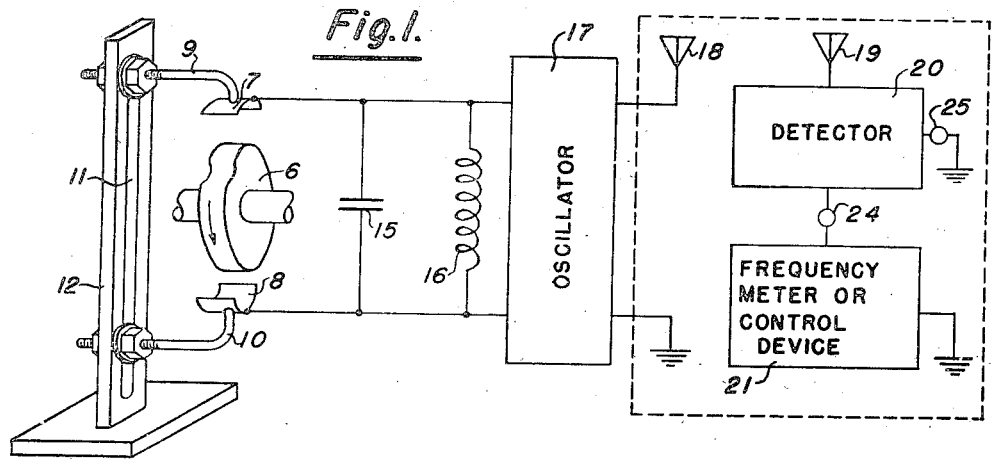
Fig. 1 is a circuit diagram of the proposed invention.
Figure 2:
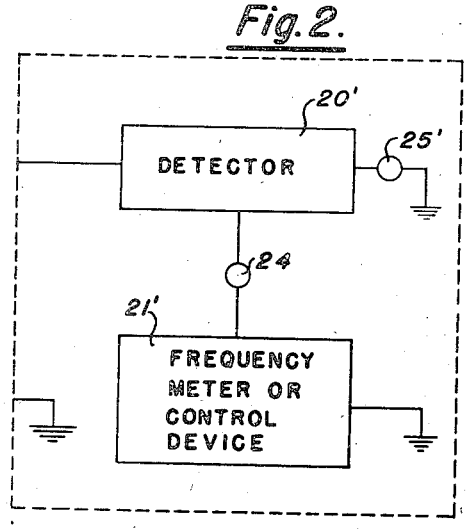
Fig. 2 is an alternate form of the detecting circuit of the invention.

In Fig. 1, an irregularly-shaped rotating member 6 is shown. Capacitor plates 7 and 8 are placed in close proximity to the rotating member 6 by adjusting the position of the supporting arms 9 and 10 along the slot 11 of the stand 12. The arms 9 and 10 are secured at the selected position by lock nuts or any other suitable means. The supporting stand will necessarily be constructed of non-conducting material. The capacitor plates 7 and 8 are then electrically connected to the opposite ends of a resonant circuit composed of a fixed capacitor 15 and an inductance 16. The tank circuit is then connected to an oscillator 17 either to amplitude-modulate or frequency-modulate the oscillator 17. A suitable antenna 18 is provided for the oscillator 17 and the customary ground connection made. The modulated carrier frequency is thus transmitted to a remote receiving antenna 19. The received radiation is introduced to a detector 20, the output of which operates a frequency meter 21. Suitable ground connections are made to the frequency meter 21 and the detector 20, appropriate output terminals 24 and 25 being provided for the detector. In the alternate form of the detecting circuit, as shown by Fig. 2, the items enclosed within the broken lines are intended to be interchangeable with the items enclosed within the broken lines of Fig. 1, and the use of either form will depend upon the existing requirements. The output of the oscillator 17 of Fig. 1 is now directly fed into the detector 20', the output of which operates a frequency meter 21' as before. Suitable ground connections and output terminals 24' and 25' are provided as in Fig. 1.

In operation, the surface irregularities of the rotating member 6 vary the capacitance of the capacitor plates 7 and 8 at the rate of rotation or in multiples of that rate depending upon the number of irregularities and the number of capacitor plates employed. This varying capacitance thus alters the resonant frequency of the tank circuit in proportion to the rate of rotation of the rotating member 6. This varying frequency is then utilized to amplitude-modulate or frequency-modulate the carrier frequency of the oscillator 17. The modulated carrier is then transmitted and received by a detector 20, Fig. 1, or directly connected to a detector 20', Fig. 2. The output signal from the detector 20 or 20' varying in proportion to the rotational speed of the rotating member 6 operates the frequency meter 21 or 21', respectively, to provide an indication of the speed of rotation of the revolving member 6.

Figure 3:
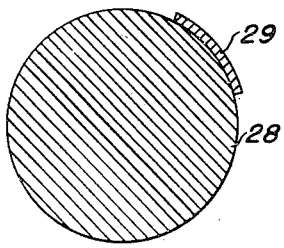
Figure 3 illustrates a method of adapting a circular rotatable member for use with the invention.

Rotating members of circular cross-section such as the shaft 28 of Fig. 3 can be altered to be used with this invention by affixing to its periphery some object 29 which will vary the capacitance of the capacitor plates as the circularly cross-sectioned shaft 28 revolves.

Figure 4:
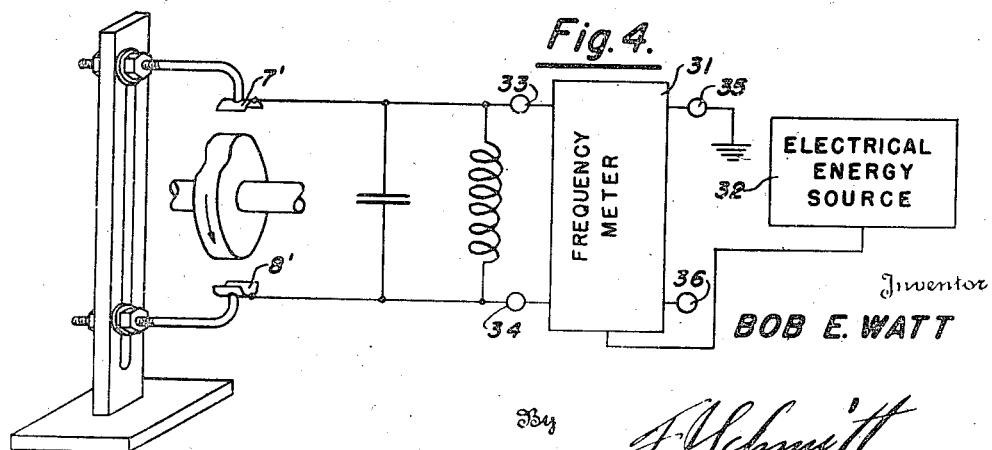
Fig. 4 is an alternate form of the proposed invention.

Fig. 4 presents a simplification of the proposed circuits of Figs. 1 and 2. The condenser plates 7' and 8' are connected to the resonant circuit as before; however, the variations occurring in the resonant circuit are directly utilized to operate a frequency meter 31. An electrical energy source 32 excites the resonant circuit and frequency meter 31. Suitable terminals 33 and 34 and 35 and 36 are provided and the necessary ground connection made in the conventional manner.

The embodiment of Fig. 1 is quite adaptable for use where remote indications are desired. Anemometers are readily adaptable to be used with this embodiment wherein an anemometer could be located in some inaccessible place such as mountain peaks or over the ocean and the indication transmitted to a central inland weather station. The embodiments of Figs. 2 and 4 are obviously more adaptable for applications wherein small distances exist between the rotating member and the desired location of the indicating device.

What is claimed is:

1. In a system for measuring the angular velocity of a rotating object of known unbalanced characteristics without making any electrical connections thereto, said system having an oscillator to be modulated, means for detecting the modulated output of said oscillator, and frequency responsive means connected to the output end of said detecting means; a speed sensing device comprising a resonant circuit for modulating the output of said oscillator, said circuit comprising a variable capacitor having opposite terminals and stationary plates connected to said terminals, respectively, said plates being so spaced and positioned as to be respectively on diametrically opposite sides of any rotating object undergoing test and free from any mechanical or electrical connection therewith, whereby irregularities in the shape of said object periodically vary the capacity of said capacitor.

2. A device according to claim 1, wherein said plates are initially adjustable to accommodate objects of varying sizes.

3. In a system for measuring the angular velocity of a rotating object of known unbalanced characteristics without making any electrical connections thereto, said system having an oscillator to be modulated, means for transmitting the modulated output of said oscillator, means for receiving said output, means for detecting the received signals, and frequency responsive means connected to the output end of said detecting means; a speed sensing device comprising a resonant circuit for modulating the output of said oscillator, said circuit comprising a variable capacitor having stationary plates connected respectively to opposite terminals thereof and so spaced and positioned as to be respectively on diametrically opposite sides of any rotating object undergoing test and free from any mechanical or electrical connection therewith whereby irregularities in the shape of said object periodically vary the capacity of said capacitor.

BOB E. WATT.

REFERENCES CITED

The following references are of record in the file of this patent:

UNITED STATES PATENTS

| Number | Name | Date |
| --- | --- | --- |
| 1,951,226 | Wold | Mar. 13, 1934 |
| 2,076,944 | Howe | Apr. 13, 1937 |
| 2,225,668 | Subkow et al. | Dec. 24, 1940 |
| 2,325,927 | Wilbur | Aug. 3, 1943 |
| 2,381,444 | Hansell | Aug. 7, 1945 |
| 2,381,645 | Carlstein | Aug. 7, 1945 |

FOREIGN PATENTS

| Number | Country | Date |
| --- | --- | --- |
| 470,454 | Germany | Jan. 15, 1929 |

OTHER REFERENCES

"An Electric Tachometer," etc. from "Electronics," June 1944, pages 100–104, 310, 312.